Dec. 11, 1934.   E. F. GOODYEAR ET AL   1,983,751
WHEEL BRAKE
Filed May 4, 1933

INVENTORS
Ernest Frederick Goodyear
Joseph Wright
by Usina & Rauber
Attorneys

Patented Dec. 11, 1934

1,983,751

UNITED STATES PATENT OFFICE 1,983,751

WHEEL BRAKE

Ernest Frederick Goodyear, Moxhall Park, Wishaw, and Joseph Wright, Stoke Park, Coventry, England, assignors to Dunlop Rubber Company Limited, London, England, a British corporation Application May 4, 1933, Serial No. 669,294
In Great Britain June 4, 1932

1 Claim. (Cl. 188—18)

This invention concerns improvements in or relating to brakes for that type of wheel in which the tire is mounted directly upon the hub of the wheel, the brake mechanism being of the type described in our copending Patent 1,937,563, December 5, 1933, filed August 18, 1932 of which the present invention is a continuation in part.

Proposals have recently been made to equip road vehicles with such wheels, and their use has found particular application in the landing gear of aeroplanes where the advantage of increased cushioning has been found particularly useful.

The use of a circular tube or annulus distended by fluid pressure has already been proposed for wheels of this kind whereby to apply the required pressure to the brake surface, but difficulty has been experienced in ensuring that on removal of the fluid pressure the inflatable annulus shall collapse to a degree sufficient to make certain that the shoe actuating surface of the annulus moves radially inwards towards the center of the axle, so as to free the brake shoes entirely from the surface upon which the frictional effort is exerted.

One of the objects of the present invention is to provide a fluid operated internal hub brake in which the release of the fluid pressure is accompanied by a positive release of the brake shoes under independent resilient pressure and in which improved means are provided for preventing the transfer of the heat due to braking from being conducted to the adjacent tire and tube.

According to this invention we provide brake mechanism as claimed in our copending Patent 1,937,563 characterized by a plurality of brake shoes movable radially outwards from a distensible annulus carried on a non-rotating cylindrical support into engagement with the inner diameter surface of a revolving tubular braking member, the outer diameter surface of which is formed with air channels defined by projections upon which are positioned a pair of tire retaining flanges.

In order that the invention may be more easily understood and readily carried into effect, the same will now be described with reference to the accompanying drawing in which:—

Fig. 2 is a part sectional end view along the line a.a. of Fig. 1 in the direction of the arrows.

Figure 1:
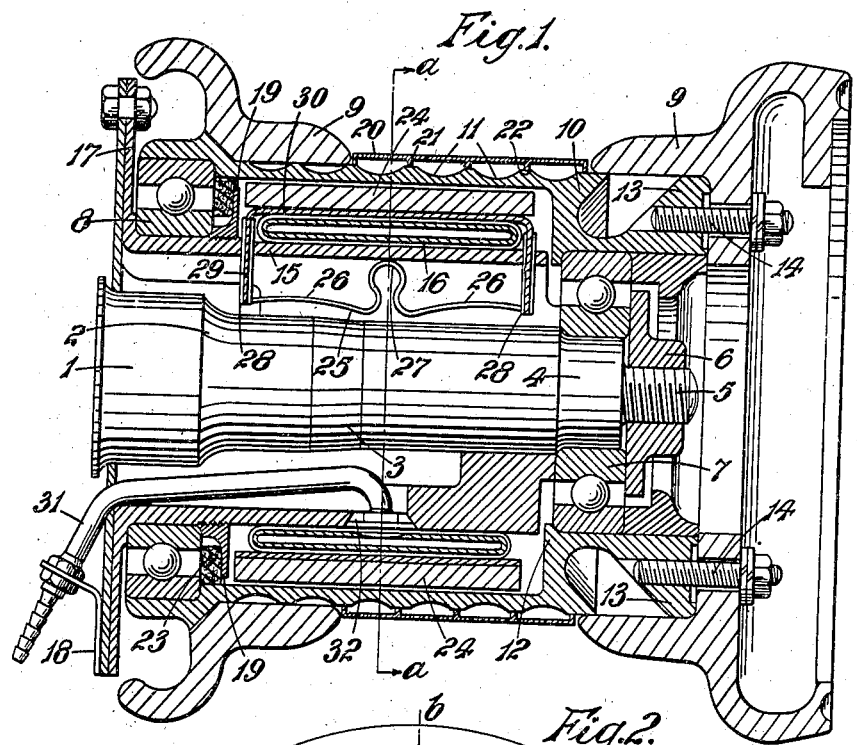
Fig. 1 is a sectional side elevation of the hub and brake along the line b.b.
Figure 2:
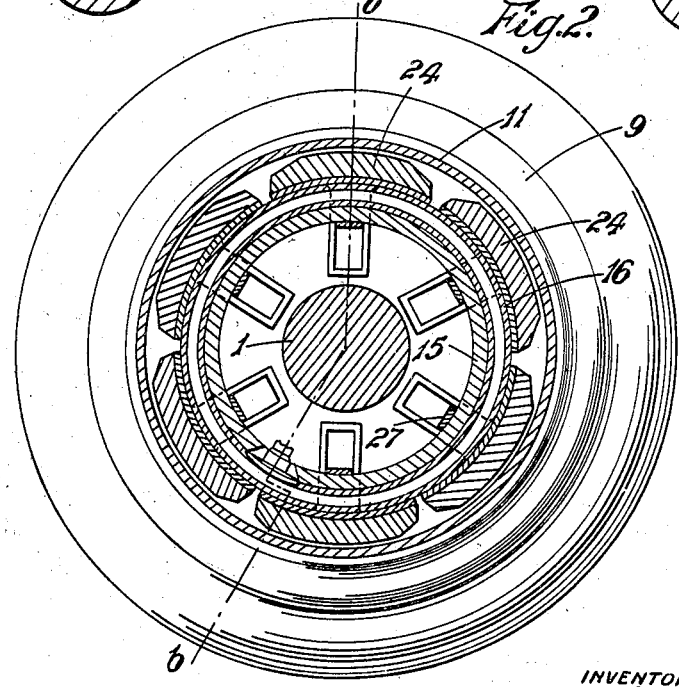
Fig. 2.

In one embodiment of the invention the assembly of the hub is as follows:—

Through the center of the hub and forming its support passes a stub axle 1, the diameter of which diminishes from adjacent the vehicle to its outer end in a plurality of steps, 2, 3, and 4, and terminates in a threaded stem 5 at the outer end.

Upon the threaded stem is secured an L-shaped ring 6, the inner vertical surface of which bears against and prevents the outward displacement of the outer cage 7 of two ball race cages 7 and 8 upon which the tire carrying flanges 9 of the hub are indirectly supported.

The internal periphery of the outer ball race is carried by a portion 4 of the shaft of decreased diameter, the shoulder defining the inner end of the neck portion serving to position the ball cage 7 at its inner side.

The external periphery of the outer ball race supports the outer end of a revolving, tubular, braking member 10, which revolves with the tire, the central part of the outer surface of this hollow braking member being formed with shallow low circumferential concave grooves 11 for the circulation of air, the inner surface constituting the brake surface to which a suitable lining may be applied if required.

The external periphery of the outer ball race cage 7 contacts a portion of reduced diameter at the outer extremity of the bore of the hollow tubular member 10, the inner end of the portion of reduced diameter having a shoulder 12 in contact with the inner vertical wall of the outer ball ring.

The outer end of the hollow, tubular member 10 which is of reduced diameter, terminates in a shoulder 13, to which is detachably secured by studs 14, the centrally apertured tire retaining flange 9.

Within the hollow tubular and revolving member 10 to which the brake is applied, is a concentric, non-rotating, cylindrical support 15 for the distensible annulus 16. The cylindrical support is substantially of L section, the vertical part 17 of which is secured to a plate 18 at the inner end of the hub, the horizontal portion extending to a point substantially coterminous with the outer ball bearing 7, the annular space 23 being filled with material such as felt, fibre or a suitable washer to prevent the exudation of oil on to the brake surfaces.

In the angle of the L shaped support 17, is the inner ball race 8, the outer periphery of which supports the inner end of the revolving tubular braking member 10, to the inner diameter of which the brake is applied, and upon and at the inner end of the grooved surface of this member 10 is positioned the inner tire bearing flange 9, separated therefrom by the air circulating channels 11.

The space between the toes of the tire retaining flanges is spanned by a liner 20 upon which the tube of the tire may rest and which prevents the tube from being chafed by contact with the ridges between the air circulating channels.

The tube supporting liner 20 between the tire flanges is in the nature of an internally ribbed annulus the feet 21 of the ribs registering with the ridges 22 in the hollow rotating member, the tube and tire being thus heat insulated from the brake by a plurality of annular channels. The liner is preferably of a vulcanized fibre composition and may comprise asbestos or may be covered therewith, if the body of the liner is made of metal.

Extending radially and parallel to the outer radial surface of the inner ball bearing, we provide a felt, fibrous or other oil retaining washer 23 positioned by a circumferential annulus 19 of L shaped section.

Upon the central and outer surface of the cylindrical air bag support 15 which is held stationary, is carried the air bag 16 which may consist of one or more annular or segmental tubes preferably of one tube.

This tube or tubes is held flat until air is admitted by the pilot or driver by compression beneath a plurality of brake shoes 24 on its external surface, the shoes being pulled constantly inwards by springs 25 which lie substantially parallel to the axle and beneath the cylindrical air bag support.

Each spring 25 is of arcuate form and consists of two end portions 26 slightly convex towards the support, but spaced therefrom, and a central joining portion 27 of circular shape, the apex of which bears against the under surface of the air bag support. The ends of the springs are connected to, or pass through slots 28 in radial extensions 29 formed on the back plates 30 to which the shoes are attached, the brakes being thus positively withdrawn by compression of the distensible annulus when the fluid pressure is released. The extensions 29 slide in fixed guides on the support 15 and thereby are held from rotation and hold the brake shoes 24. Other means may also be provided to hold the brake shoes from rotation.

The back plates are preferably positioned on the under surface of each shoe midway of its ends so as to permit of a slight rocking movement thereby ensuring a smooth application.

Air or other fluid is admitted to the distensible member or members 16 by one or more pipes 31 passed through cavities intermediate a pair of springs into a central annular cavity 32 in the air bag supporting member where the pipe may readily be connected to the bag.

Our copending application Serial No. 629,260 filed August 18, 1932 relates to brake mechanisms for vehicle wheels comprising a distensible annulus held in compression against the outer side of a circular support by a plurality of brake shoes, connected to exposed springs bearing against the inner surface of the support, preferably in which each shoe is positioned in relation to the support for distensible annulus by a member having extensions passing through slots in the support, and in which the springs are held transversely across the inner surface of the support, and are detachably engaged by the slots in the shoe carrying member, being positioned transversely across the central portion of each shoe, the ends of which are preferably of tapered cross section.

The modifications introduced by the present invention consist in making the cylindrical support and air bag of relatively great width as compared to diameter for use as an internal hub brake, the support being cylindrical instead of trough shaped and in the modifications required in the braking surface and air ducts for insulating the brake surface which are required when the tire is mounted in close proximity to and concentrically around the brake mechanism.

Having now particularly described and ascertained the nature of our said invention, we claim:

Brake mechanism comprising a plurality of brake shoes movable radially outwards, a non-rotating cylindrical support, an outer revolving tubular braking member, a distensible annulus carried on said support and actuating said shoes outwardly into engagement with the inner diameter surface of said revolving tubular braking member, the outer diameter surface of which is formed with air channels defined by projections, a pair of tire retaining flanges positioned on said projections and a tube supporting liner disposed between the tire flanges and having annular ribs on its under surface seated upon the projections formed on the outer diameter surface of the rotatable braking surface.

ERNEST FREDERICK GOODYEAR.
JOSEPH WRIGHT.